United States Patent
Chakraborty et al.

(10) Patent No.: US 12,137,153 B2
(45) Date of Patent: Nov. 5, 2024

(54) COLLECTING AND PROVIDING SENSOR DATA BASED ON A SENSOR DEFINITION VIA A SENSOR MANAGEMENT DEVICE

(71) Applicant: Microsoft Technology Licensing, LLC, Redmond, WA (US)

(72) Inventors: Tusher Chakraborty, Bangalore (IN); Ranveer Chandra, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 683 days.

(21) Appl. No.: 17/037,472

(22) Filed: Sep. 29, 2020

(65) Prior Publication Data

US 2021/0360071 A1  Nov. 18, 2021

(30) Foreign Application Priority Data

May 15, 2020  (IN) .............................. 202041020662

(51) Int. Cl.
*H04L 67/565* (2022.01)
*G16Y 40/10* (2020.01)
(Continued)

(52) U.S. Cl.
CPC ............ *H04L 67/565* (2022.05); *H04L 67/75* (2022.05); *G16Y 40/10* (2020.01); *G16Y 40/35* (2020.01); *H04L 67/125* (2013.01)

(58) Field of Classification Search
None
See application file for complete search history.

(56) References Cited

U.S. PATENT DOCUMENTS 7,149,660 B2  12/2006 Kuehn et al.
7,299,160 B2  11/2007 Hamdan
(Continued)

FOREIGN PATENT DOCUMENTS

| EP | 2860893 A1 | * | 4/2015 | ........... H04L 67/125 |
|---|---|---|---|---|
| EP | 3594829 A1 | * | 1/2020 | ............ G06F 11/302 |
| WO | WO-2012070960 A1 | * | 5/2012 | ......... H04L 12/2825 |

OTHER PUBLICATIONS

"International Search Report and Written Opinion Issued in PCT Application No. PCT/US21/022021", Mailed Date: Jun. 22, 2021, 13 Pages.

(Continued)

*Primary Examiner* — Tonia L Dollinger
*Assistant Examiner* — Ishrat Rashid
(74) *Attorney, Agent, or Firm* — Foley IP Law, PLLC

(57) ABSTRACT

The disclosure herein describes enables new sensors to be added and maintained in an Internet of Things system without upgrading firmware for the end device. A sensor abstraction layer (SAL) manages the end sensors, and a sensor definition layer (SDL) in the cloud interfaces with the SAL. Sensor definition data of a sensor connected to the end device is identified in a sensor definition data store of the SDL including sensor configuration data. The sensor configuration data is sent to the SAL, wherein the SAL is configured to collect sensor data from the sensor via a sensor interface. Sensor data is received from the SAL via an established network connection and converted into converted sensor data based on a data conversion model of the sensor definition data. The converted sensor data is then provided to an application, connected to a sensor management device, for consumption.

18 Claims, 8 Drawing Sheets

(51) Int. Cl.
*G16Y 40/35* (2020.01)
*H04L 67/125* (2022.01)
*H04L 67/75* (2022.01)

(56) References Cited

U.S. PATENT DOCUMENTS

| | | | |
|---|---|---|---|
| 2009/0276525 A1 | 11/2009 | Jo et al. | |
| 2013/0013088 A1 | 1/2013 | Liekens et al. | |
| 2014/0025338 A1* | 1/2014 | Blount | G01D 18/00 |
| | | | 702/183 |
| 2017/0090866 A1 | 3/2017 | Vaughn et al. | |
| 2019/0265971 A1 | 8/2019 | Behzadi et al. | |
| 2020/0136429 A1* | 4/2020 | Susilo | H02J 13/00022 |
| 2020/0382850 A1* | 12/2020 | Wild | G01D 9/005 |
| 2020/0387127 A1* | 12/2020 | McGill | G06V 20/20 |
| 2021/0141351 A1* | 5/2021 | Yang | H04L 67/12 |

OTHER PUBLICATIONS

Díaz, María Soledad Escolar, "A Generic Software Architecture for Portable Applications in Heterogeneous Wireless Sensor Networks", In Doctoral Thesis of University Carlos III of Madrid, Mar. 2010, 288 Pages.

Gigan, et al., "Sensor Abstraction Layer: A Unique Software Interface to Effectively Manage Sensor Networks", In Proceedings of the 3rd International Conference on Intelligent Sensors, Sensor Networks and Information, Dec. 3, 2007, pp. 479-484.

Mezei, et al., "The Dynamic Sensor Data Description and Data Format Conversion Language", In Proceedings of the 13th International Conference on Software Technologies, vol. 1, Jul. 26, 2018, 9 Pages.

* cited by examiner

COLLECTING AND PROVIDING SENSOR DATA BASED ON A SENSOR DEFINITION VIA A SENSOR MANAGEMENT DEVICE

CROSS-REFERENCE TO RELATED APPLICATION

This nonprovisional application claims priority to Indian Patent Application No. 202041020662 entitled "COLLECTING AND PROVIDING SENSOR DATA BASED ON A SENSOR DEFINITION VIA A SENSOR MANAGEMENT DEVICE", filed May 15, 2020, the entire disclosure of which is incorporated by reference herein.

BACKGROUND

Use of sensors is vital for the operation of many modern devices and networks. However, the operation of sensors is often specific to the sensor interface, manufacturer, sensor type, or the like. As a result, the devices that use sensors must be configured to use specific firmware to operate the connected sensors. Further, sensing devices often require the integration of new sensors after deployment (e.g., a device needs to sense a new phenomenon, upgrade to a new sensor model, or adopt changes from a sensor manufacturer). Such changes require firmware to be modified and/or updated, which is often done manually. However, manual firmware updates are not feasible for large-scale deployment, require users with technical expertise, require downtime of the devices. Alternatively, firmware may be updated over the air using a network, but this functionality is only supported by certain high-end devices and requires higher bandwidth that may exceed the capabilities of some devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method is described. A network connection is established between a sensor definition layer of the sensor management device and a sensor abstraction layer of the end device. Sensor definition data of a sensor connected to the end device is identified in a sensor definition data store of the sensor definition layer, wherein the sensor definition data is organized in a generic data structure that is independent of sensor type and wherein the sensor definition data includes sensor configuration data and a data conversion model associated with a sensor type of the sensor stored in the generic data structure. The sensor configuration data of the sensor definition data is sent to the sensor abstraction layer via the established network connection in a generic communication format based on the generic data structure, wherein the sensor abstraction layer is configured to configure the sensor and execute commands to collect sensor data from the sensor via a sensor interface based on the sensor configuration data in the generic communication format. Sensor data is received from the sensor abstraction layer via the established network connection and converted into converted sensor data based on the data conversion model of the sensor definition data. The converted sensor data is then provided to a user interface connected to the sensor management device.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
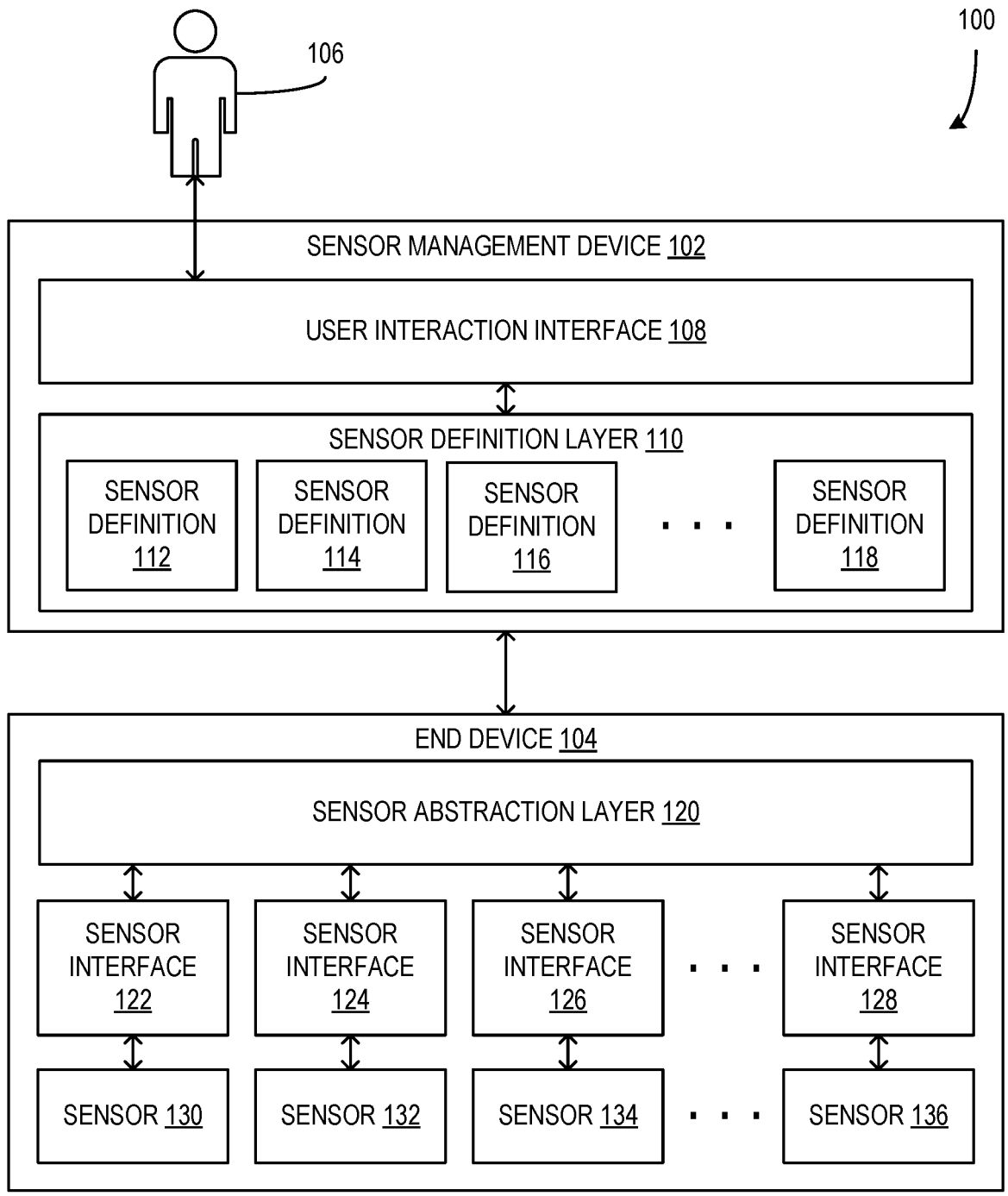
FIG. 1 is a block diagram illustrating a system for configuring an end device to collect data from connected sensors, converting the collected data, and providing converted sensor data to a user via a sensor management device according to an embodiment.

The disclosure describes systems and methods that maintain abstracted sensor definitions in a central sensor management device, separate from the end devices that are directly connected to the sensors in a network such as an Internet of Things (IoT) network. The sensor definitions can be created, edited, and/or otherwise maintained at the sensor management device and, upon connection to the sensor management device by an end device, the sensor definitions are used to configure (e.g., firmware) of the end device to operate connected sensors.

The described systems and methods enable the conversion of sensor data from sensors of an end device via a sensor management device. A network connection is established between a sensor definition layer (SDL) of the sensor management device and a sensor abstraction layer (SAL) of the end device. Sensor definition data of a sensor connected to the end device is identified (e.g., using an identifier of the sensor) in a sensor definition data store of the SDL. The sensor definition data includes sensor configuration data (e.g., configuration parameters, sensor commands, and other associated data enabling the SAL to configure and operate the sensor(s)) for configuring and operating the sensor by the SAL. The sensor configuration data is sent to the SAL, which is configured to interact with the sensor via a sensor interface. Sensor data is received, obtained, or otherwise collected from the SAL and converted into converted sensor data based on a data conversion model of the sensor definition data. In some examples, the converted sensor data is then provided to a user interface connected to the sensor management device. In other examples, the converted sensor data is then provided an application for further processing, without display on the user interface.

The disclosure addresses the challenges, among others, of managing sensors on devices due to the specificity of firmware requirements of sensors and the wide variety of possible sensors, and due to the time and effort costs associated with updating sensor firmware manually or over the air on a large scale. The described systems and methods operate in an unconventional manner by enabling the generic abstraction of firmware parameters that are managed in a centralized location and that can be used to configure an abstract layer (e.g., the SAL) to operate as firmware for a wide variety of different end devices with connected sensors. Using the sensor management device and associated SDL enables the configuration and operation of any sensor-end device combination without changing the actual firmware of the end device via the SAL on each end device. The SAL is configured to configure, perform operations with, and collect data from associated sensors using a generic abstraction of firmware in combination with the sensor definition data from the SDL. As a result, the configuration and operation of sensors on end devices are abstracted to be generic and flexible such that the described system is compatible with a wide variety of different sensor models and/or sensor types. Further, network bandwidth usage is reduced due to the configuration data sent between the SDL and SAL being smaller than the alternative of full firmware updates, time and effort costs of developing specific and complicated firmware for sensors are reduced or eliminated, and maintenance costs of maintaining sensor-based devices on a large scale are reduced due to the sensor definitions being provided to multiple devices from the central SDL as described herein.

FIG. 1 is a block diagram illustrating a system 100 for configuring an end device 104 to collect data (e.g., raw data) from connected sensors 130-136, converting the raw data, and providing converted sensor data to a user 106 via a sensor management device 102 according to an embodiment. While the operation of the system 100 is described herein with reference to collecting raw sensor data in some examples, the system 100 is operable to collect any kind of sensor data (e.g., raw, formatted, processed, partial, complete, or otherwise). The system 100 includes a sensor management device 102 and an end device 104. In some examples, the sensor management device 102 includes hardware, firmware, and/or software configured to enable interaction with users, such as user 106, via the user interaction interface 108 and to enable interaction with the end device 104 via the sensor definition layer 110 (SDL). Additionally, or alternatively, the sensor management device 102 may be configured as a "cloud device" or as a server device or devices that are configured to operate as described herein by interacting with users 106 and/or end devices 104 via network connections over a network, such as the Internet, local network, or other network arrangements. For instance, the sensor management device 102 may be configured as a server device within a network of an entity that is configured to be accessible by users via other devices on the network and to interact with end devices that are also connected to the network.

The end device 104 includes hardware, firmware, and/or software configured to interact with the sensor management device 102 via the sensor abstraction layer 120 (SAL) and to configure and interact with the sensor interfaces 122-128 and associated sensors 130-136 as described herein. In some examples, the end device 104 is a device configured to directly connect to the sensors 130-136 by physical interfaces. Alternatively, or additionally, the end device 104 may be configured to connect to the sensors via network interfaces or the like. For instance, the end device 104 may be configured to physically house or otherwise include the sensors 130-136 and be located in the location in which the sensor data is to be collected by the sensors 130-136. Further, the system 100 may further includes a plurality of end devices in addition to end device 104 and the sensor management device 102 may be configured to interact with the plurality of end devices as described herein with respect to the end device 104.

Returning to the components of the sensor management device 102, the user interaction interface 108 is configured to interact with the user 106 to enable the user 106 to view or otherwise receive sensor data collected by the sensors 130-136 and/or related to the data collected by the sensors 130-136 (e.g., raw sensor data converted and/or aggregated to form human-interpretable data). Further, in some examples, the user interaction interface 108 is configured to enable the user 106 to provide sensor definition data of sensor definitions 112-118 to the sensor management device 102, such that the user 106 can define how the sensor management device 102 and end device 104 interact to configure the sensors 130-136 and collect associated data. The user interaction interface 108 may include one or more graphical user interfaces (GUIs) that enable the user 106 manage the state of the sensor definitions 112-118 of the SDL 110 and to select sensor data to view and/or select formats in which to view the sensor data (e.g., define timeframes of data to view or identify types of graphs or other visualizations to view with respect to collected data). Exemplary GUIs of the user interaction interface 108 are described below with respect to FIGS. 6A-C below.

Additionally, or alternatively, in some examples, the user interaction interface 108 is configured as a cloud-accessible interface, such that the interface 108 is accessed by user 106 via a network connection using another device. For instance, the user interaction interface 108 may be configured as a web interface that the user 106 accesses using a personal computing device via a web browser application or other similar application. The user 106 is enabled to access the web or other network-based interface of the user interaction interface 108 to register new sensor types or edit existing sensor types by providing or editing sensor definitions. Further, the user 106 may be enabled to register new end devices 104 using the user interaction interface 108 by providing end device configuration data and sensor type mappings of the end devices, such that, upon connection of the sensor management device 102 to an end device 104, the sensor management device 102 is enabled to obtain an identifier of the end device 104, determine sensor types associated with the end device 104, and provide the associated sensor definitions to the end device 104, as described herein.

The SDL 110 of the sensor management device 102 is configured to store sensor definitions 112-118 and interact with the SAL 120 of the end device 104 based on the stored sensor definitions 112-118 as described herein. In some examples, the SDL 110 is configured to establish a connection with the SAL 120 and send sensor definition data of the sensor definitions 112 to the SAL 120 to enable the SAL 120 to configure, operate, and/or interact with the sensors 130-136 as described herein. The sensor definitions 112-118 of the SDL 110 include sensor definition data, such as configuration data (e.g., configuration parameters, sensor commands, and other associated data enabling the SAL to configure and operate the sensor(s)), associated with sensor types that are supported by the end device 104 and/or other end devices to which the SDL 110 may be connected. Additionally, the sensor definitions 112-118 may include a data conversion model (e.g., a formula for converting raw data to human-interpretable data, conversion and/or aggregation schemes for generating data averages, trends, or the like). In some examples, the sensor definitions 112-118 are not specific to individual sensors 130-136, but rather they are configured to apply to all sensors of a defined sensor type. Further, the data of each sensor definition of the sensor definitions 112-118 are organized and/or arranged in a generic data structure that is independent of specific sensors, sensor types, and/or sensor models, such that sensor configuration data, such as configuration parameters and command data, that are specific to a sensor, sensor model, and/or sensor type may be stored in a consistent manner in the sensor definitions 112-118. As a result, sensor definitions with the same generic structure but different data values stored therein may be created to apply to different sensors. Sensor definitions are described in greater detail below with respect to FIG. 2. It should be understood that the communications between the SDL 110 and the SAL 120 based on the sensor definitions 112-118 and the consistent data structure in which the sensor definitions 112-118 are stored and/or the generic, consistent communication format based on the data structure operates as a sensor definition communication protocol between the SDL 110 and the SAL 120, such that the SDL 110 can provide a sensor definition associated with any type of sensor that is organized in the generic, consistent data structure and the SAL 120 is thereby able to interpret the sensor definition and apply to any sensors that match the type of the received sensor definition as described herein. The generic data structure in which the sensor definitions are organized provide a consistent structure that can be interpreted by the SAL 120 without the SAL 120 having to be specifically configured to handle many different types of sensor definitions. Further, as a result of using the generic, consistent data structure for sensor definition information of a variety of different sensor types enables the end device 104, through the described operations of the SAL 120, to be reconfigured to effectively interact with sensors of various different sensor types without updating or otherwise altering the firmware of the end device 104.

Additionally, or alternatively, the generic, consistent data structure of the sensor definitions enables user 106 to define custom sensor definitions as described herein and to begin using those custom sensor definitions with sensors of end device 104 without updating or otherwise altering the firmware of or otherwise pre-configuring the end device 104. The end device 104 that includes a sensor with which a custom sensor definition is associated can be configured to interact with that sensor through receiving the custom sensor definition in the described generic, consistent data structure from the SDL 110 and the processing of the custom sensor definition by the SAL 120 as described herein. The SAL 120 is configured to handle many different sensor definitions, including custom defined sensor definitions, because those sensor definitions are organized according to the generic, consistent data structure as described herein.

Additionally, the SDL 110 may be configured to store end device information, such as identifiers of end devices to which the SDL 110 may be connected. The stored end device information may further include a mapping of sensor types to each end device that indicates the sensor types of the sensors with which the end device is associated. As previously mentioned, the end device information and associated sensor type mappings may be provided to the SDL 110 by a user 106 during registration of the end device. Alternatively, or additionally, in some examples, end device 104 may be configured to provide sensor type mapping information upon the establishment of the connection between the SDL 110 and the SAL 120. For instance, the end device 104 may be configured to identify sensor types of connected sensors via communication with those sensors and to share the sensor types with the SDL 110 upon connection establishment.

In some examples, the SDL 110 is further configured to convert raw sensor data received from the SAL 120 to human-interpretable data or otherwise converted data based on the data conversion model of the associated sensor definition. The data conversion model is described in greater detail below.

The SAL 120 is configured to interact with the SDL 110 via a network connection according to the sensor definition communication protocol as described herein and to perform operations as firmware for configuring and interacting with sensors 130-136 connected to the end device 104 via the sensor interfaces 122-128. In some examples, the SAL 120 is coupled to or otherwise connected to the SDL 110 via an established network connection between the sensor management device 102 and the end device 104. Such a network connection may be over an internal network, an external network, a cloud-based network, or the like. The SAL 120 is configured to receive sensor definition data from the SDL 110 via the established connection and to use the sensor definition data to configure and interact with the sensors via the sensor interfaces 122-128. In some examples, the sensor definition data from the SDL 110 is received in an abstracted communication structure and/or communication format that is generic and consistent regardless of associated sensor types and/or models (e.g., via the sensor definition communication protocol as described), such that the SAL 120 is enabled to receive and interpret sensor definition data associated with any sensor. For instance, the SAL 120 may use the received sensor definition data to prepare the end device 104 for sensor operation (e.g., setting up communication parameters, triggering sensor operations, "warming up" sensors), provide configuration parameters to the sensors 130-136, to send commands to the sensors 130-136, and to retrieve raw sensor data from the sensors 130-136, regardless of the sensors 130-136 including sensors of different types and/or models, based on the sensor definition data being received in a consistent, generic communication format. Such operations may be performed by providing instructions or commands to the sensor interfaces 122-128 specific to the sensors 130-136 with which the SAL 120 is interacting. Additionally, the SAL 120 is configured to store and/or organize received sensor definition data as abstractions of associated sensor types and/or models based on the different sensors and/or types of sensors with which the end device 104 is associated (e.g., the SAL 120 may store sets of configuration data associated with each sensor type in a separate or otherwise organized manner). Further, the SAL 120 is configured to send retrieved or collected sensor data from the sensors 130-136 to the SDL 110 via the established network connection.

The sensor interfaces 122-128 make up a sensor interface layer (SIL) and are configured to operate as part of firmware for the associated sensors 130-136. Each sensor interface 122-128 is specific to the hardware interface of the associated sensor and/or the communication protocol with which the sensor is compatible (e.g., a communication protocol between a microcontroller of the end device 104 and the sensor, such as an Inter-Integrated Circuit (I2C) protocol or RS485 microcontroller protocol). The sensor interfaces 122-128 are configured to directly communicate with the associated sensors 130-136, including sending commands to the sensors 130-136 and receiving collected sensor data from the sensors 130-136.

The sensors 130-136 are configured to collect data from the environment or other sources in proximity with or otherwise associated with the sensors. In some examples, the sensors include digital sensors and/or analog sensors. Further, the sensors 130-136 may be compatible with different hardware interfaces and/or communication protocols (e.g., I2C protocols). Additionally, the sensors 130-136 of the end device 104 may include sensors that are compatible with differing protocols and differing hardware interfaces and that are configured to collect differing types of data. For instance, the sensors 130-136 may include sensors that collect temperature data, sensors that collect humidity data, sensors that collect carbon dioxide ($CO_2$) concentration data, or the like. Further, in other examples, the sensors 130-136 may include more, fewer, or different sensors without departing from the description herein.

Figure 2:
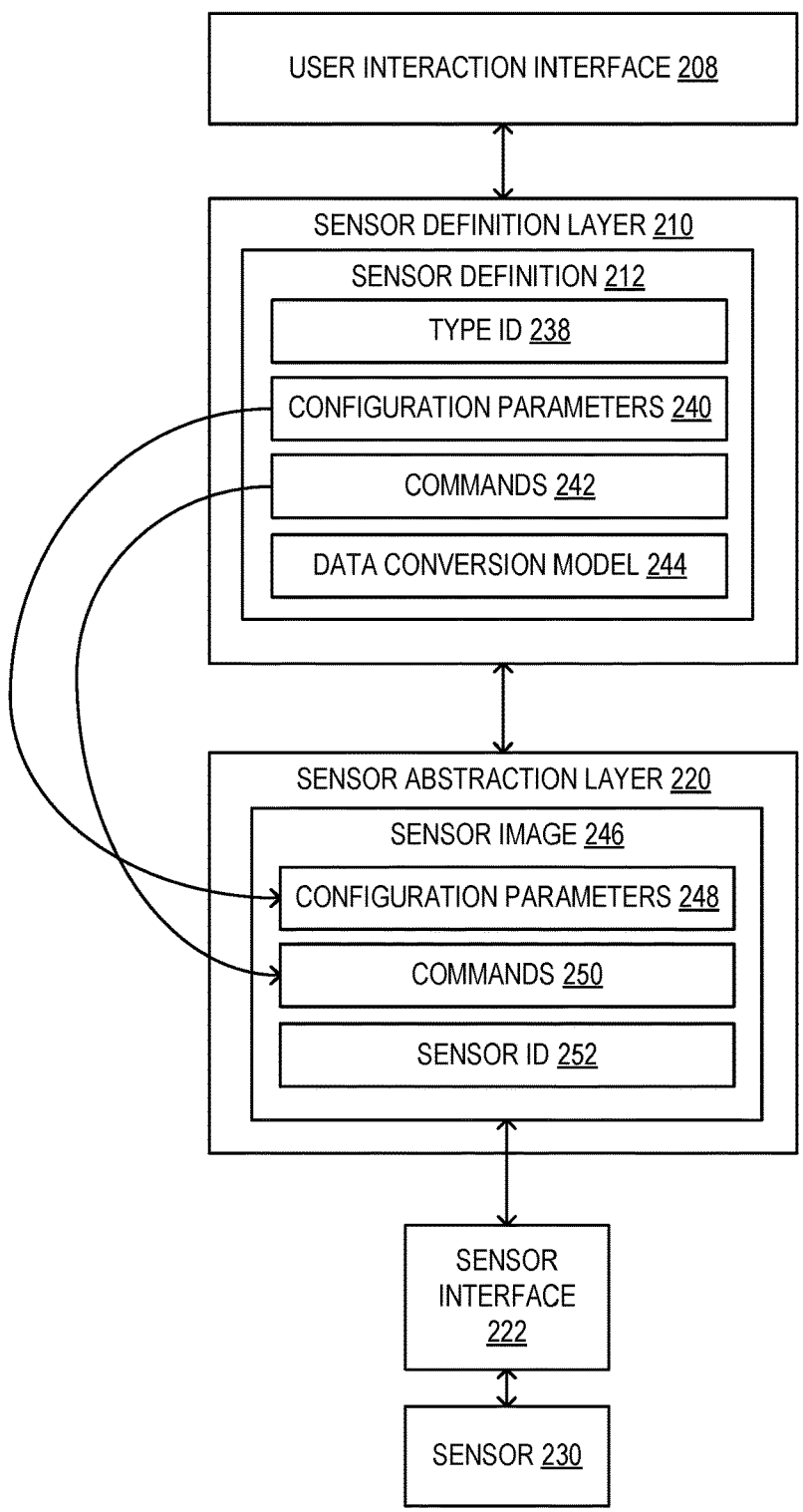
FIG. 2 is a block diagram illustrating a system configured for sending sensor definition data from a sensor definition layer (SDL) of a sensor management device to a sensor abstraction layer of an end device to configure the end device to interact with connected sensors according to an embodiment.

FIG. 2 is a block diagram illustrating a system 200 configured for sending sensor definition data from an SDL 210 of a sensor management device to an SAL 220 of an end device to configure the end device to interact with connected sensors (e.g., sensor 230) according to an embodiment. In some examples, the system 200 is part of a system such as system 100 of FIG. 1 described herein. Further, the user interaction interface 208, the SDL 210, the SAL 220, the sensor interface 222, and the sensor 230 may be configured to operate in substantially the same manner as the user interaction interface 108, the SDL 110, the SAL 120, the sensor interface 122, and the sensor 130 described above, respectively.

The SDL 210 is configured to send at least a portion of the sensor definition data in the sensor definition 212 to the SAL 220 upon establishment of a network connection. The sensor definition 212 includes a type ID 238, configuration parameters 240, commands 242, and a data conversion model 244. In some examples, the type ID 238 is a unique identifier associated with the type of the sensor 230 (e.g., a universal unique sensor type ID (UUSTI)). Each sensor definition in the SDL 210 may include a different type ID, enabling the SDL 210 to access specific sensor definitions based on the type IDs associated therewith. Additionally, the SDL 210 may include a type ID map that stores associations between sensor type IDs and other identifiers or indicators of sensor type, such as sensor model numbers, sensor manufacturer information, or the like. In some examples, the sensor definitions described herein are stored and/or organized in a generic structure and/or format that is independent of specific sensor type and/or model such that sensor definition data of any type of sensor may be stored as a sensor definition according to the generic structure. This enables the SDL 210 to store configuration data, operational data, and other data associated with sensors of a variety of sensor types in consistent, generic structures and/or formats, enhancing the flexibility and compatibility of the SDL 210 and the associated system.

The configuration parameters 240 of the sensor definition 212 include configuration data that enables the SAL 220 to configure the sensor interface 222 and associated sensor 230 and to prepare the sensor 230 for operation and collection of data. In some examples, the configuration parameters include sensor address data (e.g., an address or addresses by which the sensor is controlled and/or observed), clock frequency data or other timing data (e.g., indicators of a timing pattern at which the sensor operates), warmup time data (e.g., indicators of time taken for the sensor to become ready to collect data and/or other data values associated with the sensor warming up), physical sensor port data (e.g., an indicator as to which network port of the end device the sensor is connected), command configuration data such as a total number of commands, and/or other data associated with configuration of the sensor, such as a total number of bytes to receive.

The commands 242 include command data that enable the SAL 220 to send compatible commands to the sensor interface 222 and the connected sensor 230. The commands 242 include commands for writing to or otherwise commanding the sensor interface 222 to perform an operation and/or commands for retrieving collected sensor data from the sensor interface 222. In some examples, the commands 242 include command data such as command type data (e.g., indicators of the type of command, such as read commands, write commands, or one-time commands that are only used once on setup, such as address setup of the sensor, broadcast messaging, or the like), command length data (e.g., an indicator (e.g., in bytes) for the length of the command body), command body data (e.g., a combination of characters and/or other data values that form the body of the command and are compatible with the associated sensor interface 222 and sensor 230), and/or wait time data (e.g., an indicator (e.g., in seconds) for how long the SAL 220 should wait until sending the next command).

The data conversion model 244 of the sensor definition 212 is configured to convert raw sensor data collected by the sensor 230 into human-readable or otherwise converted data and/or information for provision to a user via the user interaction interface 208. In some examples, the data conversion model 244 includes one or more data conversion formulae that are used to convert the raw data values from the sensor 230 into a form and/or format that can be more easily interpreted by users. For instance, such a formula may be used to eliminate extraneous zeroes from data values, round off data values to a defined number of significant digits, and/or convert data values from one unit type to another unit type (e.g., converting temperature data from a raw data value into degrees Fahrenheit).

Additionally, the data conversion model 244 may be configured to apply defined formatting to the data values, such as appending unit indicators to numeric data values. Further, the data conversion model 244 may be configured to aggregate or otherwise combine raw data values to generate combined data values, such as average data values over a time period, median data values from a set of collected data values, rates of change of data values over time periods, or the like. To make use of such processes of the data conversion model 244, the SDL 210 may be configured to store a set of collected data values from the sensor 230 over a defined time period. The stored set of collected data values may then be converted and/or analyzed based on the data conversion model 244 as described herein.

In some examples, the SDL 210 further includes a mapping of end devices to sensor types. The mapping may be used by the SDL 210 to determine which sensor definitions to provide to an end device upon establishment of a network connection. The mapping may include an identifier of each end device to which the SDL 210 is configured to connect and associated sensor IDs of the sensors that the associated end device is configured to include. When the SDL 210 connects to the SAL 220 of the end device, an identifier of the end device is provided to the SDL 210 and the SDL uses the provided identifier to determine the set of sensor IDs associated with the end device based on the mapping. Additionally, in some examples, the mapping may also include end device-specific information about the sensors connected therewith, such as port information indication specific ports of the end device to which the sensors are connected.

The SDL 210 is configured to send sensor configuration data, including the configuration parameters 240 and commands 242, to the SAL 220 to enable the SAL 220 to configure and interact with the sensor 230. Upon receiving the configuration parameters and commands, the SAL 220 saves the data in a sensor image 246 associated with the sensor 230 as configuration parameters 248 and commands 250. In some examples, the SAL 220 is configured to maintain and/or manage a sensor image (e.g., sensor image 246) for each sensor to which it is connected. In some examples, the configuration parameters, commands, and/or other sensor definition data sent from the SDL 210 to the SAL 220 are sent in an abstracted and/or generic communication format or structure that is independent of sensor type or model (e.g., the packet format described herein), such that the SAL 220 may receive the configuration parameters and commands and create a generically structured sensor image with sensor type-specific data stored therein, regardless of the type or model of the sensor. The sensor image 246 is configured to include data specific to the sensor 230 in a generic and/or abstracted sensor image structure and store the sensor ID 252 that specifically identifies the sensor type and/or specific sensor 230. As a result, the SAL 220 is enabled to access the sensor image 246 and use the data therein to interact with the sensor 230 via the sensor interface 222. For instance, the SAL 220 may use the configuration parameters 248 of the sensor image 246 to configure the sensor interface 222 and associated sensor 230 for operation and then use the commands 250 to cause the sensor 230 to collect sensor data via the sensor interface 222 as described herein. It should be understood that the SAL 220 is configured to perform configuration and operation processes associated with a specific sensor in a generic manner based on the sensor image structure, which is abstracted and independent of specific sensor types and/or models, such that sensor-specific operations performed by the SAL 220 are the result of the SAL 220 processing sensor-specific data within the sensor image structure consistently, regardless of sensor type. For instance, in some examples, the SAL 220 is configured to turn on or activate the sensor 230 based on a port number of the configuration parameters 248, warm up the sensor based on a warm up time and/or other associated parameters, and set up the clock frequency of communications with the sensor 230 (e.g., an I2C protocol-based frequency). After setting up the sensor 230, the SAL 220 may sequentially execute the commands 250 based on the order of the commands 250 in the sensor image and command timing information of the commands 250 and thereby collect data from the sensor 230 using read commands of the commands 250. It should be understood that the SAL 220 may be configured to sequentially execute commands provided for all sensor images that are present as a generic process and the specific commands executed by the SAL 220 for each specific sensor are based on the sensor-specific commands provided by the SDL 210 from each associated sensor definition and stored in each associated, generically structured, sensor image. The collected data may then be sent to the SDL 210 via the established network connection as described herein.

Figure 3:
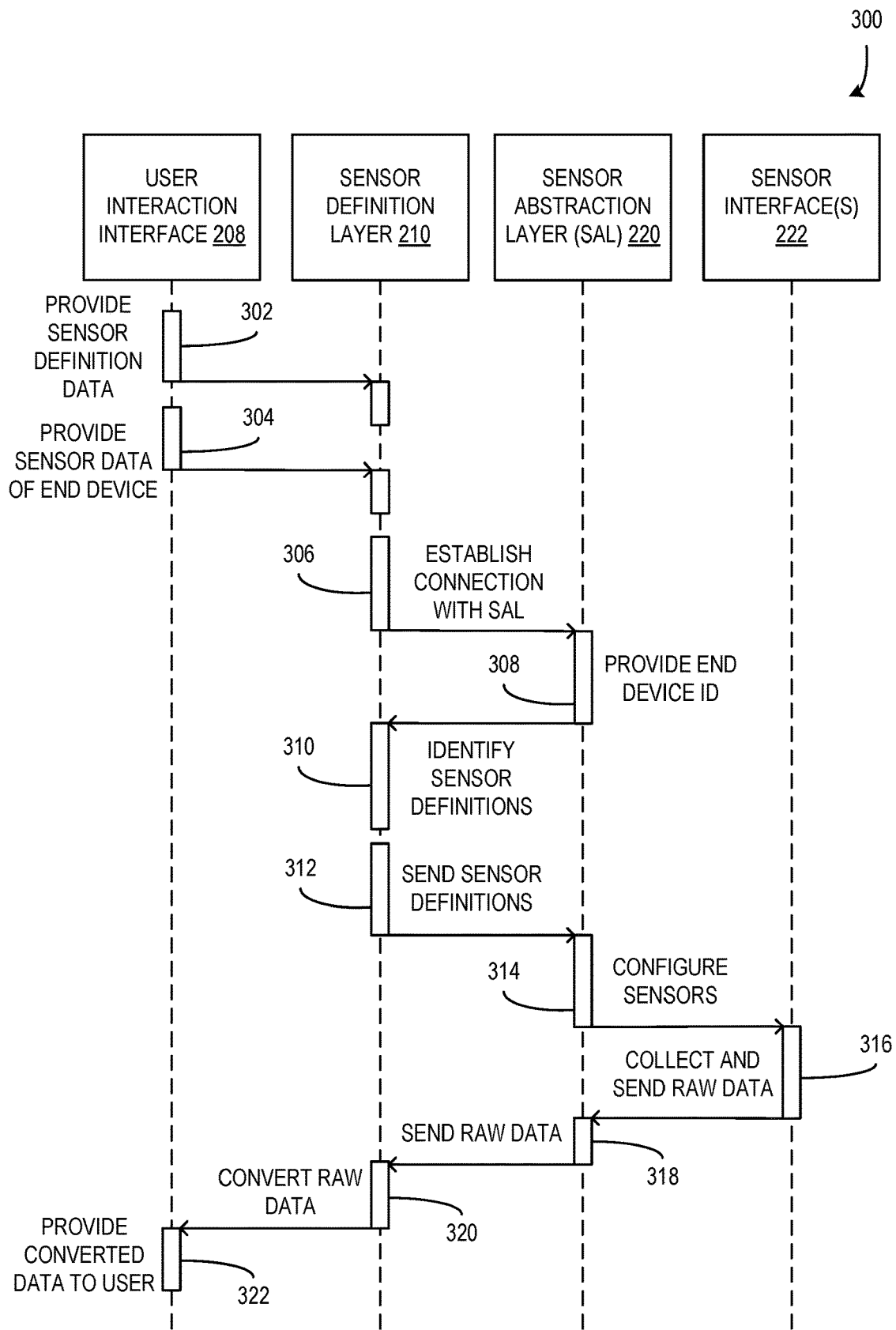
FIG. 3 is a sequence diagram illustrating a process of receiving sensor definition data from a user interaction interface, configuring sensors based on the sensor definition data, and providing data from the sensors according to an embodiment.

FIG. 3 is a sequence diagram illustrating a process 300 of receiving sensor definition data from a user interaction interface 208, configuring sensors based on the sensor definition data, and providing data from the sensors according to an embodiment. In some examples, the process 300 may be performed by one or more components of a system such as systems 100 and 200 of FIGS. 1 and 2, respectively. At 302, the user interaction interface 208 provides sensor definition data to the SDL 210 and, at 304, the user interaction interface 208 provides sensor data of end devices to the SDL 210. The sensor definition data and sensor data of end devices may be provided to the user interaction interface 208 by a user of the interface as described herein. In some examples, the sensor definition data and/or sensor data of end devices may be provided to the SDL 210 multiple times and in different orders during operation of the associated system without departing from the description herein.

At 306, the SDL 210 establishes a connection with the SAL 220. In some examples, the SDL 210 is on a cloud-based sensor management device and the SAL 220 is located on an end device that includes or is otherwise directly connected to sensors, such that the established connection is a network connection using cloud-based network infrastructure.

At 308, the SAL 220 provides an end device ID to the SDL 210 via the established connection. At 310, the SDL 210 identifies the sensor definitions for the end device based on the provided end device ID and the sensor data of the end device that was previously provided (e.g., at 304). In some examples, identifying the sensor definitions includes accessing a mapping of end devices to associated sensor types where the sensor data of the end device is stored. The sensor types from the mapping are used to determine the matching sensor definitions for the end device.

At 312, the SDL 210 sends the identified sensor definitions to the SAL 220. In some examples, sending the sensor definitions includes sending configuration parameters (e.g., configuration parameters 240) and/or commands (e.g., commands 242) of the sensors of the end device to the SAL 220. Further, the SAL 220 may store the sensor definition data as a sensor image or sensor images (e.g., sensor image 246) for the sensors with which the end device is associated.

Additionally, or alternatively, sending the sensor definitions includes sending one or more network packets in a defined format over the network connection between the SDL 210 and the SAL 220. The network packet may include a preamble portion that includes a code that is unique to the described sensor management process, such that the packet can be identified by the end device and/or SAL 220 as a sensor management packet containing sensor definition information. Further, the packet may include a packet length value indication the total length of the packet and a sensor type ID indicating the type of sensor with which the included sensor definition data is associated. The packet also includes a configuration parameters block that includes the configuration parameter data (e.g., configuration parameters 240) and a command block that includes the command data (e.g., commands 242). Finally, an end character or data value may be included to indicate the end of the packet.

In some examples, such as examples in which the sensor is I2C protocol-compatible, the configuration parameter block of the packet includes a sensor address (1 byte), a clock frequency index (1 byte), a warmup time in seconds (2 bytes), a sensor port (1 byte), a total quantity of commands (1 byte), and a total quantity of bytes to receive (1 byte). Further, the command block of the packet may include one or more commands in a defined sequence, with each command being represented by a command type (2 bits), a command length (6 bits), the command body (an array of bytes as indicated in the command length), and a wait time before next command (2 bytes). The order in which the commands are sent in the packet may be used as the order in which the SAL 220 executes the commands in order to collect data from the associated sensor.

In further examples, such a sensor definition packet may be sent to the SAL 220 including only a configuration parameter block and no command block to change configuration parameters of the associated sensor without changing any of the commands. Alternatively, or additionally, commands of a sensor may be updated by sending a packet with the changed commands included.

At 314, the SAL 220 configures the sensors via the sensor interfaces 222. In some examples, the SAL 220 uses received configuration parameters to activate or otherwise turn on the sensors, perform setup processes on the sensors, and the like via the sensor interfaces 222. At 316, after the sensors are configured, the sensors collect raw data and provide the raw data to the SAL 220 via the sensor interfaces 222. In some examples, collecting the data with the sensors further includes the SAL 220 performing commands of the sensor in a defined sequence via the sensor interfaces 222 to repeatedly collect sensor data over a period of time as defined in the sensor image of the sensor on the SAL 220. As a result, though the collecting of raw data is illustrated only once in the process 300, in other examples, the interactions between the SAL 220 and the sensor interfaces 222 to collect data from the sensors may occur repeatedly over a period of time.

At 318, the SAL 220 sends the raw data to the SDL 210 via the established connection. Upon receiving the raw data, at 320, the SDL 210 converts the raw data to converted data (e.g., user-interpretable data, formatted data, organized data, aggregated data, and/or combined data). In some examples, converting the raw data is based on the data conversion model of the sensor definition associated with the sensor from which the data was collected as described herein.

Once the data is converted at the SDL 210, the converted data is provided to a user at 322 by the user interaction interface 208. In some examples, providing the converted data to the user includes displaying the converted data in a GUI of the user interaction interface 208, including displaying formatted data values and/or visualizations associated with the converted data, such as graphs, charts, and/or tables to provide the converted data in an efficient, comprehensive manner.

Figure 4:
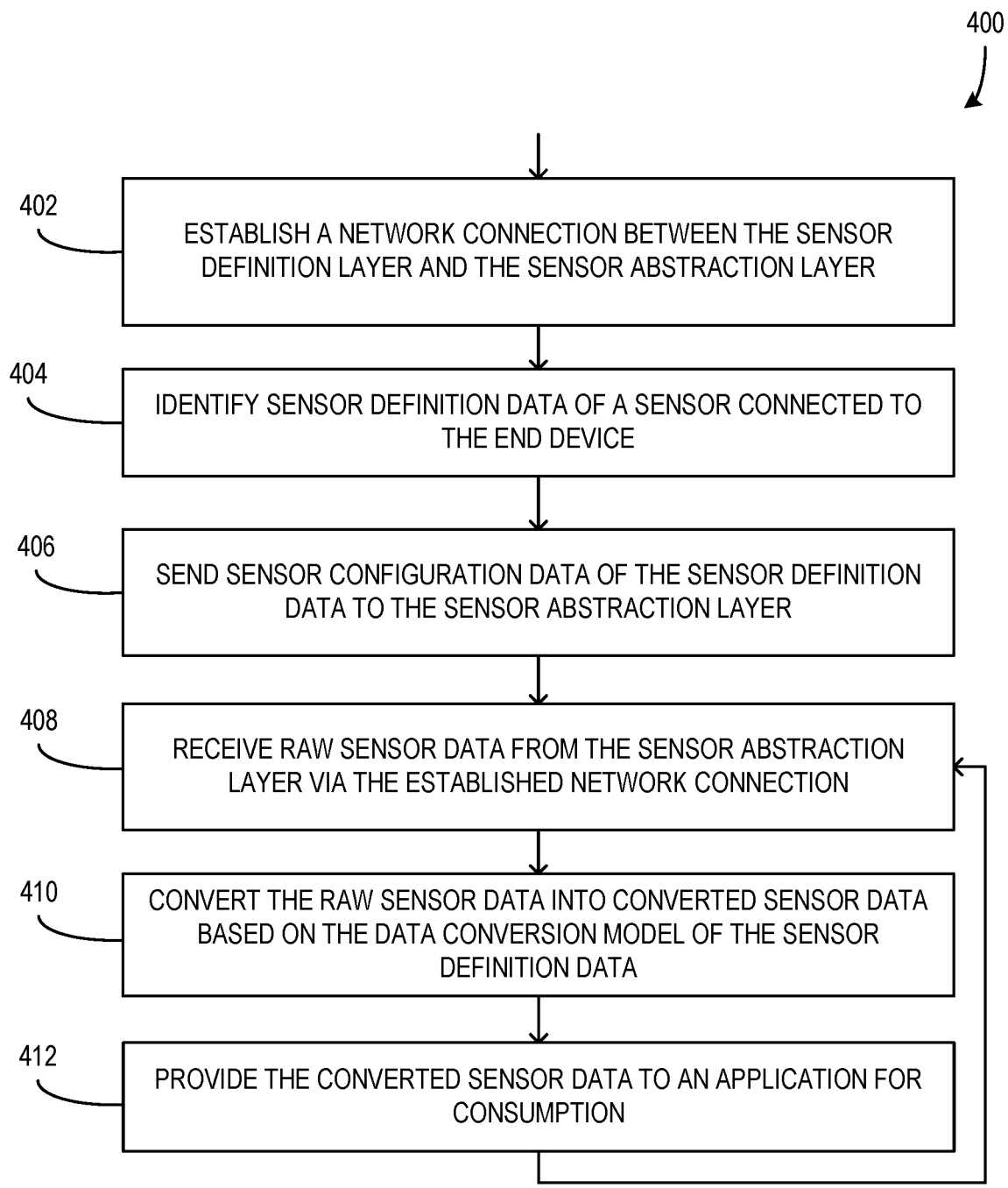
FIG. 4 is a flowchart illustrating a process of providing converted sensor data from sensors of an end device via a sensor management device according to an embodiment.

FIG. 4 is a flowchart illustrating a process 400 of providing converted sensor data from sensors (e.g., sensors 130-136) of an end device (e.g., end device 104) via a sensor management device (e.g., sensor management device 102) according to an embodiment. In some examples, the process 400 is performed by one or more components of a system such as systems 100 and 200 of FIGS. 1 and 2, respectively. At 402, a network connection is established between the SDL and the SAL. In some examples, the SDL is a component of a sensor management device that is a cloud-based device and the SAL is a component of an end device that is directly connected to one or more sensors via sensor interfaces as described herein.

At 404, sensor definition data of a sensor connected to the end device is identified. In some examples, the identified sensor definition data includes sensor definitions associated with a plurality of sensors connected with the end device. Further, identifying the sensor definition data may be based on the sensor type of the sensor(s) connected with the end device as described herein.

At 406, sensor configuration data of the identified sensor definition data is sent to the SAL via the established connection between the SDL and the SAL. In some examples, the configuration data is sent in the form of a configuration data packet that is formatted in a defined manner such that it is identifiable as a configuration data packet by the SAL and/or other components of the end device with which the SAL is associated. Further, the sent configuration data may include configuration parameters that enable the SAL to configure the associated sensor operations and/or command(s) that enable the SAL to interact with the associated sensor when the sensor is activated to collect sensor data therefrom.

At 408, the SDL receives raw sensor data from the SAL via the established network connection. In some examples, the SDL may receive raw sensor data repeatedly for a defined time period or for the time period during which the associated sensor is active and collecting or capturing the raw sensor data.

At 410, the SDL converts the raw sensor data into converted sensor data based on a data conversion model of the sensor definition data. The conversion may include transforming the raw sensor data based on a data conversion formula of the data conversion model. Further, in some examples, the conversion includes formatting and/or aggregating raw sensor data into a converted form (e.g., tables, graphs, charts, or other visualizations) that is interpretable by users in an efficient manner.

At 412, the converted sensor data is provided to an application, connected to the sensor management device, for consumption. In some examples, the converted sensor data is provided to a user interface connected to the sensor management device. The converted sensor data may be provided to a user interaction interface of the sensor management data for sending to or displaying the converted sensor data to users of the sensor management device. Additionally, or alternatively, the sensor data may be provided to the user interface of a user's device via a network connection to the sensor management device with which the SDL is located (e.g., when the SDL is on a cloud-based device and a user is accessing the converted sensor data through a web interface over a network connection the cloud-based device). Alternatively, or additionally, the converted sensor data may be provided to more and/or different applications for storage, processing, or other types of consumption.

In some examples, the raw sensor data is received repeatedly from the SAL such that, after 412, the process 400 may loop back to 408 to receive the next set of raw sensor data. Alternatively, the process 400 may end when raw sensor data is no longer received from the SAL and/or based on receiving any other indicator that the process should end.

Figure 5:
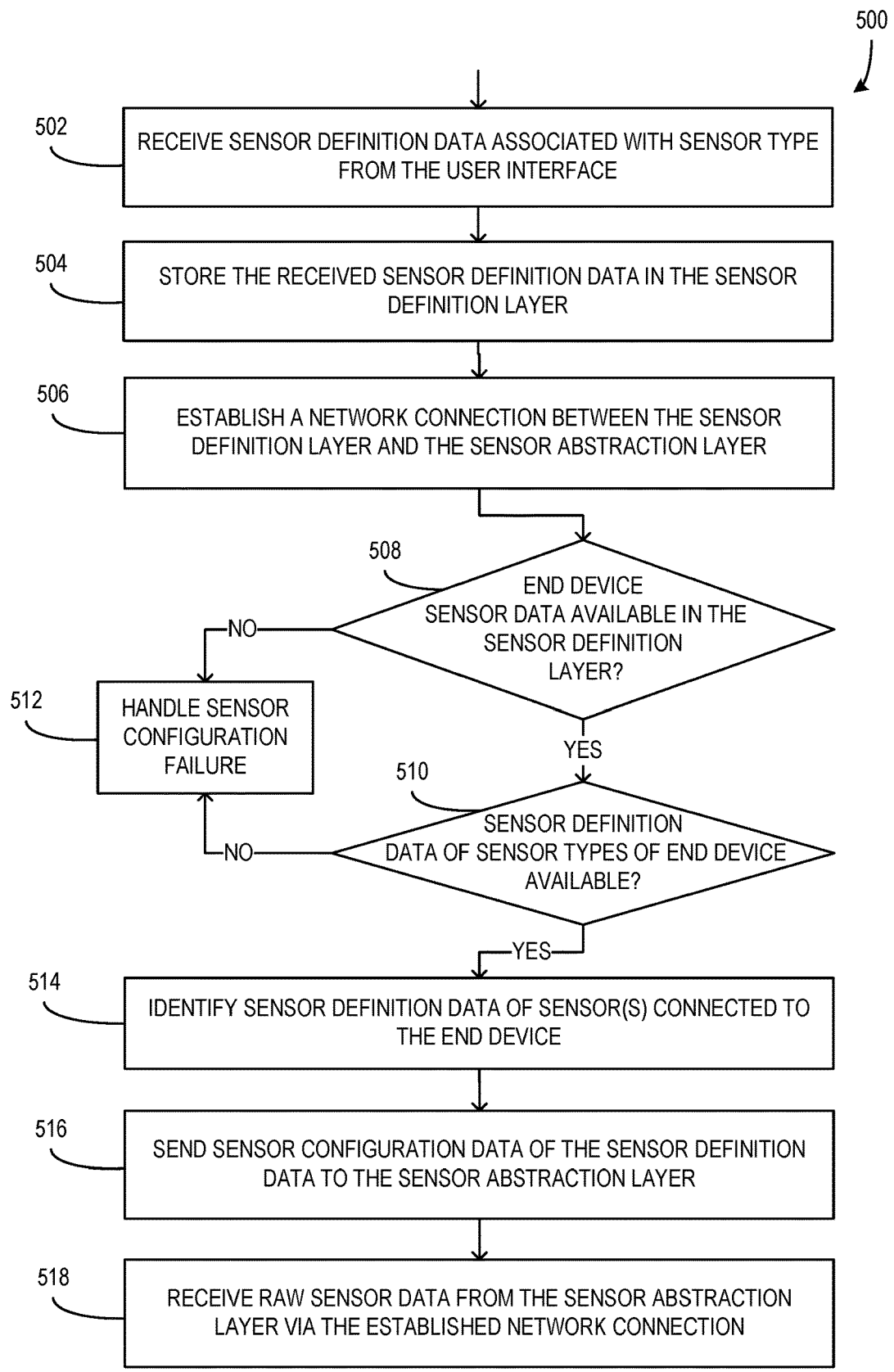
FIG. 5 is a flowchart illustrating a process of receiving sensor definition data from a user interface and configuring the SDL to provide converted sensor data from sensors of an end device via a sensor management device according to an embodiment.

FIG. 5 is a flowchart illustrating a process 500 of receiving sensor definition data (e.g., sensor definition 212) from a user interface (e.g., user interaction interface 108, 208) and configuring a sensor definition layer (SDL 110, 210) to provide converted sensor data from sensors (e.g., sensors 130-136) of an end device (e.g., end device 104) via a sensor management device (e.g., sensor management device 102) according to an embodiment. In some examples, the process 500 is performed by one or more components of a system such as systems 100 and 200 of FIGS. 1 and 2, respectively. At 502, an SDL receives sensor definition data associated with a sensor type from a connected user interface. In some examples, the user interface is a user interaction interface of a sensor management device with which the SDL is associated and the sensor definition data is provided by a user via a network connection between the user's device and the sensor management device. The sensor definition data may include configuration parameters, a sensor identifier or ID, sensor commands, and/or other types of sensor definition data as described herein.

At 504, the SDL stores the received sensor definition data in a sensor definition data structure associated with the sensor type (e.g., an UUSTI included in the sensor definition data). In some examples, the SDL receives and stores sensor definition data as it is received from the user interface over a period of time during which the SDL is active. The received sensor definition data may be associated with new sensor types that do not yet have an associated sensor definition stored by the SDL and/or sensor types that already have a sensor definition stored by the SDL and are being updated with new or updated sensor definition data.

At 506, a network connection is established between the SDL and the SAL. In some examples, the establishment of the network connection occurs in substantially the same manner as described above with respect to 402 of FIG. 4.

At 508, if end device sensor data for the connected end device is available in the SDL, the process proceeds to 510. Otherwise, the process proceeds to 512. In some examples, the SDL is configured to store end device sensor data in the form of a mapping between end device identifiers and sensor type identifiers as described herein. Such a mapping may be populated with data or otherwise provided by users of the system in a similar manner to how the sensor definition data is provided via the user interface. Based on the establishment of the network connection, the SDL may receive or otherwise obtain an identifier of the end device with which the SAL is associated and use that end device identifier to determine if any associated sensor type data is available in the mapping and, if so, which sensor types are associated with the end device.

At 510, if the sensor definition data of the sensor types of the end device are available, the process proceeds to 514. Alternatively, if the sensor definition data of the sensor types of the end device are not available, the process proceeds to 512. In some examples, if the identified sensor types from the end device mapping described above are associated with sensor definitions on the SDL, the process proceeds to 514.

At 512, either the end device sensor data is not available, or the sensor definition data of identified sensor types is not available and, as a result, the sensor configuration has failed and is handled according to a defined sensor configuration failure process. In some examples, the failure process includes notifying a manager or other user of the sensor management device that the configuration process has failed for one or more sensors of a connected end device. Further, in some examples, if sensor definition data for some sensor types of the end device is available, the sensor configuration process for those sensor types may continue at 514 while the sensor configuration process for the other sensor types of the end device may fail to 512.

At 514, the sensor definition data of the sensor(s) connected to the end device is identified and, at 516, sensor configuration data of the identified sensor definition data is sent to the SAL of the end device. After the sensors connected to the SAL via sensor interfaces are configured, the SDL receives raw sensor data from the SAL via the established network connection at 518. 514, 516, and 518 may be performed in substantially the same manner as 404, 406, and 408 described above with respect to FIG. 4. Further, in some examples, the process 500 may handle the received raw sensor data as described above with respect to at least 410 and 412 of FIG. 4.

Figure 6A:
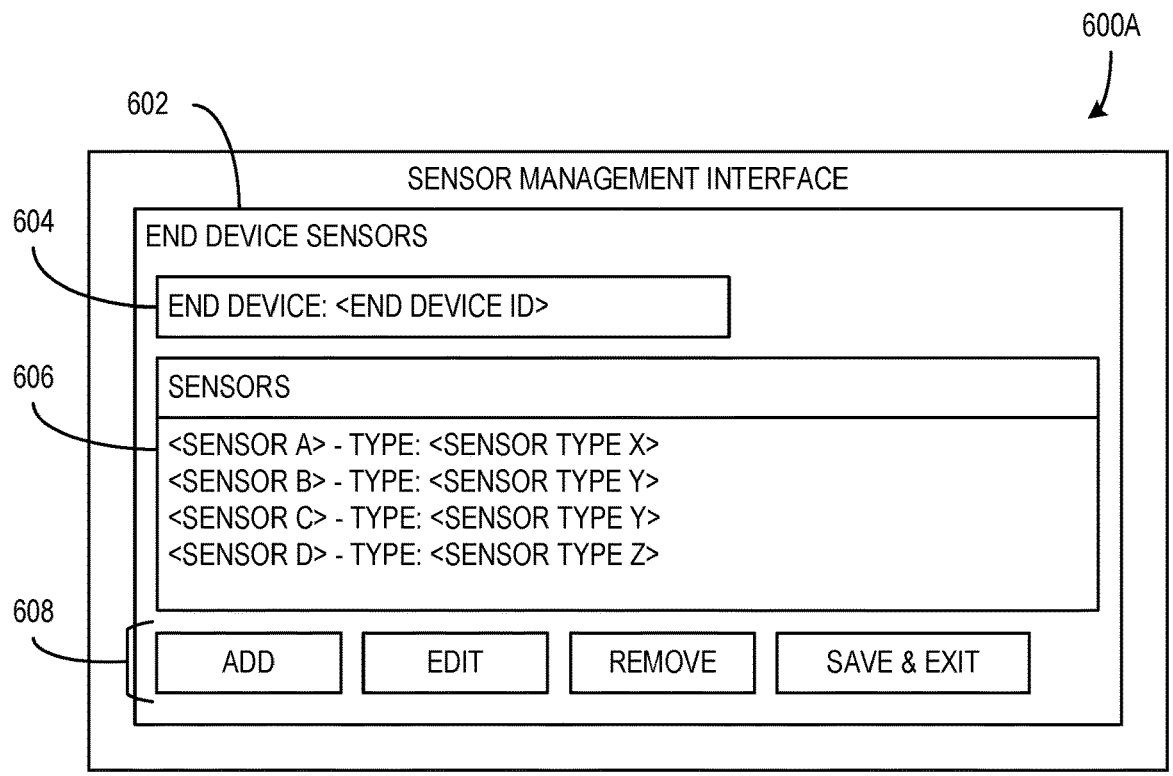
FIG. 6A is a diagram illustrating a graphical user interface (GUI) configured to enable a user to provide end device sensor data according to an embodiment.

FIG. 6A is a diagram illustrating a GUI 600A configured to enable a user to provide end device sensor data according to an embodiment. In some examples, the GUI 600A is provided to a user (e.g., user 106) via a user interaction interface (user interaction interface 108) of a sensor management device (e.g., sensor management device 102) of a system such as system 100 of FIG. 1. The sensor management interface GUI 600A includes an end device sensor section 602 that displays sections that enable a user to define sensors that are incorporated with or otherwise connected to an end device. In some examples, the information provided by the user in the section 602 is stored by an SDL of the associated system in the form of an end device-sensor mapping as described herein. The custom defined sensor definition data provided by the user may be stored in a generic data structure, or otherwise a data structure that is defined independently of the sensor type and used consistently for multiple sensor types, as described herein.

An end device identification section 604 is included in the section 602. The section 604 includes an end device label and an end device identifier, such that the user is enabled to identify which end device is being defined. In some examples, the user is enabled to enter an end device ID into the section 604 when providing sensor data for an end device that has not previously been entered in the system. Additionally, or alternatively, the section may be automatically populated with the end device ID of the end device that the user has selected to edit in examples where the user chooses to edit end device sensor data that has already been entered in the system.

A sensor section 606 displays the set of sensors that are currently connected to or otherwise associated with the end device identified by the end device ID in the section 604. The sensor section 606 displays a list of sensors identified by sensor identifiers or names (e.g., sensor A, sensor B, sensor C, and sensor D) and associated with sensor types (e.g., sensor type X, sensor type Y, and sensor type Z). In some examples, the sensors information displayed in the sensor section 606 may be selectable and/or editable by the user, enabling the user to change and/or complete the set of sensors associated with the end device for storage in the system.

The button section 608 enables the user of the interface to perform actions to add to or otherwise adjust the end device-sensor relationships that are shown. The button section 608 includes an "add" button that enables the user to add a new sensor to the set of sensors in section 606, an "edit" button that enables the user edit sensor data that is entered in section 606, a "remove" button that enables the user to remove sensors from the set of sensors in section 606, and a "save & exit" button that enables the user to save the sensor data entered in the section 606 with association to the end device shown in section 604 and to exit the section 602 (e.g., returning back to a previous GUI associated with the GUI 600A). In other examples, the GUI 600A may include more, fewer, or different sections enabling the user to manage end device sensor data without departing from the description herein.

Figure 6B:
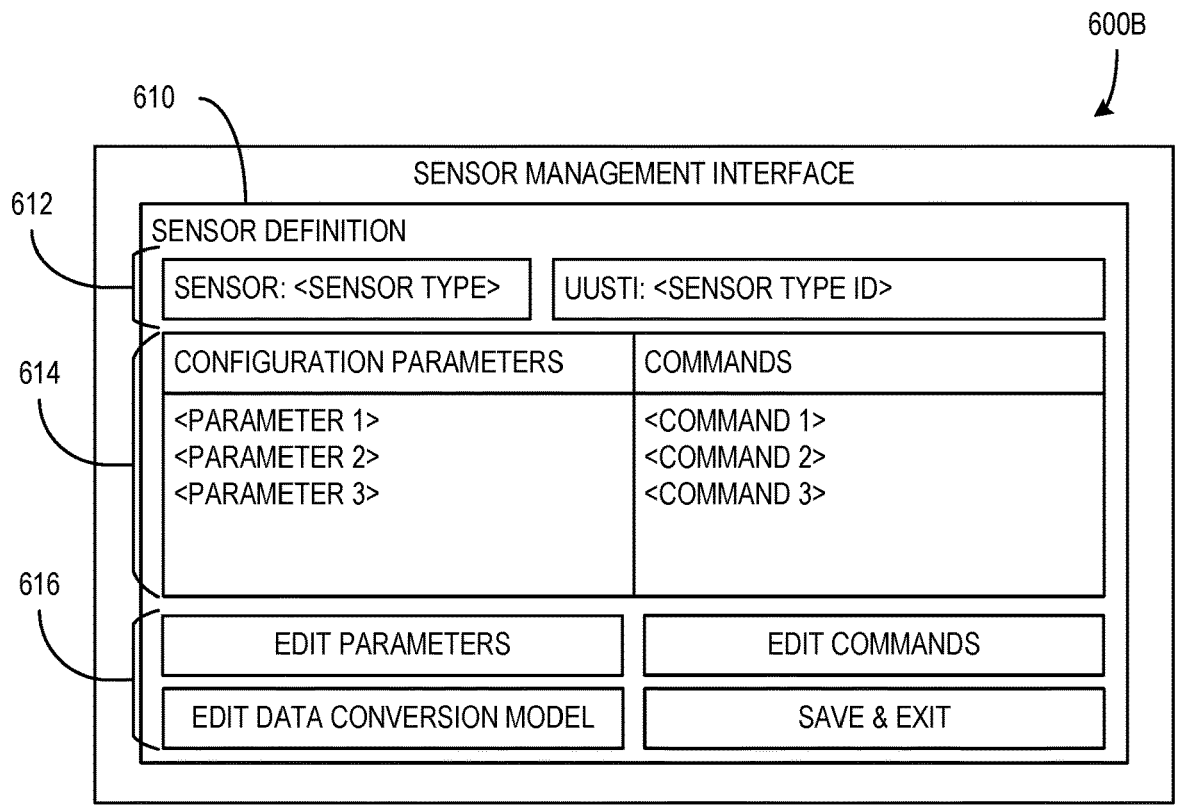
FIG. 6B is a diagram illustrating a GUI configured to enable a user to provide sensor definition data according to an embodiment.

FIG. 6B is a diagram illustrating a GUI 600B configured to enable a user to provide sensor definition data according to an embodiment. In some examples, the GUI 600B is provided to a user (e.g., user 106) via a user interaction interface (user interaction interface 108) of a sensor management device (e.g., sensor management device 102) of a system such as system 100 of FIG. 1. The sensor management interface GUI 600B includes a sensor definition section 610 that displays sections that enable a user to define sensor definition data for a sensor type as described herein. The sensor identification section 612 includes a component for viewing and/or entering a sensor type (e.g., a name of a type of sensor) and a component for viewing and/or entering a sensor type ID (e.g., a UUSTI of the sensor type) that uniquely identifies the sensor type.

The sensor definition parameter section 614 includes subsections for configuration parameters and commands associated with the sensor type. The current configuration parameters and current commands are listed in the respective sections. In some examples, the listed parameters and commands may be selectable and/or editable, enabling the user to interact with and/or make changes to the sensor definition of the sensor type currently displayed. Additionally, or alternatively, the listed parameters commands may be selected and then interacted with via the buttons of the button section 616.

The button section 616 of the sensor definition section 610 includes buttons that enable the user to interact with the sensor definition data associated with the displayed sensor type. The button section 616 includes an "edit parameters" button enabling a user to edit the configuration parameters of the sensor definition that are displayed in the parameter section 614, including adding new configuration parameters, removing configuration parameters, and/or editing configuration parameters. Similarly, the button section includes an "edit commands" button enabling a user to edit commands of the sensor definition that are displayed in the parameter section 614, including adding new commands, removing commands, and/or editing commands. Further, the button section 616 includes an "edit data conversion model" button that enables a user to edit the data conversion model of the sensor definition. In some examples, activating the "edit data conversion model" button causes another GUI to be displayed that enables the user to create, edit, or remove aspects of the data conversion model of the sensor definition, such as data conversion formulas, data conversion formatting definitions, and/or data visualization definitions for use with the sensor data of the displayed sensor type. Finally, the button section 616 includes a "save & exit" button that enables a user to save the current state of the sensor definition as displayed to the system (e.g., to the sensor definitions of the SDL of the system) and to exit the GUI 600B (e.g., and return to a previous GUI). In other examples, the GUI 600B may include more, fewer, or different sections that enable a user to manage sensor definitions without departing from the description herein.

Figure 6C:
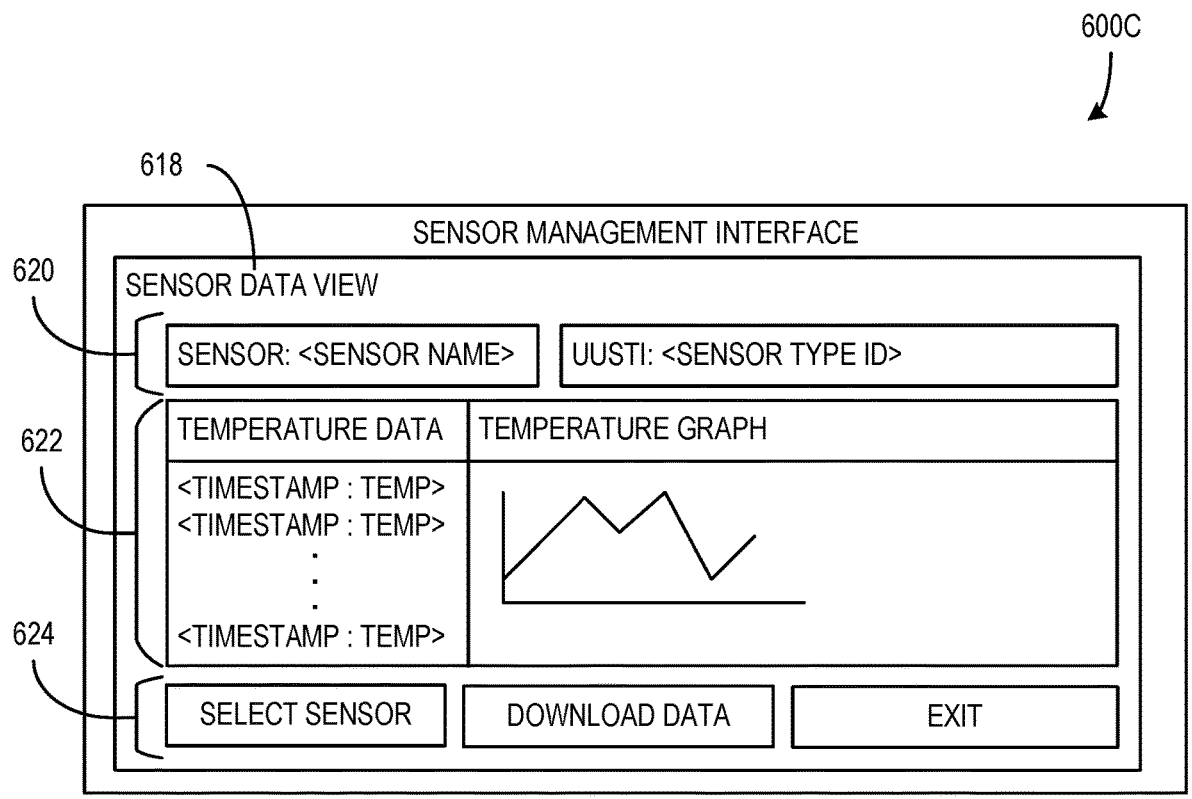
FIG. 6C is a diagram illustrating a GUI configured to enable a user to view converted sensor data according to an embodiment.

FIG. 6C is a diagram illustrating a GUI 600C configured to enable a user to view converted sensor data according to an embodiment. In some examples, the GUI 600C is provided to a user (e.g., user 106) via a user interaction interface (user interaction interface 108) of a sensor management device (e.g., sensor management device 102) of a system such as system 100 of FIG. 1. The data viewing interface GUI 600C includes a sensor data view section 618 that displays sections that enable a user to view or otherwise obtain converted sensor data from a sensor as described herein. The sensor identification section 620 includes a component for viewing and/or entering a sensor type (e.g., a name of a type of sensor) and a component for viewing and/or entering a sensor type ID (e.g., a UUSTI of the sensor type) that uniquely identifies the sensor type. The sensor identification section 620 enables a user to identify the sensor with which the displayed data is associated.

The sensor data view section 618 further includes a converted data display section 622 that is configured to display and/or otherwise provide the converted data values associated with the displayed sensor. The illustrated sensor is a temperature sensor, so the converted data display section 622 includes a list of temperature data that include timestamps and associated temperature data values collected by the sensor. The converted data display section 622 further includes a temperature graph portion that provides a visualization of the change in temperature values collected by the sensor over time. The formatting of the converted data display section 622 may be based on the data conversion model of the sensor definition as described herein. Further, in other examples, a displayed sensor is of a different sensor type and, as a result, the converted data display section 622 may display different types of data values and/or visualizations without departing from the description herein.

The sensor data view section 618 further includes a button section 624 that enables a user to interact with the sensor data view section 618 and/or associated subsections. The button section 624 includes a "select sensor" button that enables a user to select a sensor for which to display converted data in the converted data display section 622. In some examples, activating the "select sensor" button causes another GUI, such as a dialog box or the like, to be displayed enabling the user to select from one or more sensors that for which converted data can be displayed. The button section 624 further includes a "download data" button which may enable a user to download the data being displayed in the sensor data view section 618 to a personal computing device. In examples where the GUI 600C is accessed over a network connection to a cloud-based device, it may be desirable for a user to be able to download the displayed data to their own device for further analysis or other uses. Finally, the button section 624 includes an "exit" button, which enables a user to exit the interface for displaying the current sensor. In some examples, a previously displayed GUI may be displayed when the "exit" button is activated.

Additional Example Scenarios

Aspects of the disclosure enable various additional scenarios, such as next described.

In an example, an SCD30 $CO_2$ sensor definition is provided to an SDL of a sensor management device by a user using a user interaction interface of the device. The provided sensor definition data includes the following configuration parameters:

Sensor Address: (0x61<<1)
I2C Clock Frequency: 100,000 Hz
Warmup Time: 10 seconds
Physical Sensor Port Number (End Device-Specific) 1
Total Number of Commands: 4
Total Number of Bytes to Receive: 18
Additionally, the provided sensor definition data includes the following commands:
Command 1:
  Command Type: 0 (write)
  Command Length: 5 bytes
  Command: 0x00, 0x01, 0x00, 0x00, 0x81

Wait Time Before Next Command: 0 seconds
Command 2:
  Command Type: 0 (write)
  Command Length: 2 bytes
  Command: 0x03, 0x00
  Wait Time Before Next Command: 2 seconds
Command 3:
  Command Type: 1 (read)
  Command Length: 18 bytes
  Command: to be read
  Wait Time Before Next Command: 0 seconds
Command 4:
  Command Type: 0 (write)
  Command Length: 2 bytes
  Command: 0x01, 0x04
  Wait Time Before Next Command: 0 seconds After the user enters the sensor definition data, it is saved to the SDL as a sensor definition for SCD30 $CO_2$ sensors. As described herein, upon connection of an end device associated with such a sensor to the SDL, the SDL sends the configuration parameters and commands to the SAL of the end device and the SAL configures the sensor(s) and then begins performing the commands sequentially in order to collect sensor data from the sensor.

In another example, an SDL of a sensor management device includes sensor definitions for sensors compatible with RS485 Modbus protocols. The sensor definitions include configuration parameters specific to such protocols, including a Baud Rate parameter, a Parity parameter, and a Stop Bit parameter. The sensor definitions further include data enabling the SDL and/or SAL to use a packet format that is compatible with the protocol when sending commands. For instance, in some examples, the protocol-specific packet includes a 1-byte sensor address, a 1-byte function code, a range of data bytes (0-252 bytes), and a 2-byte cyclic redundancy check (CRC). In the case of a write command, the data bytes are constructed to include the command and the function code is set based on the register to be read from the sensor. This function code portion may be set in the sensor interface of the sensor. The CRC may be calculated by the SDL and passed along to the SAL. Alternatively, in the case of a read command, the range of data bytes is set to a size of the data to be read from the sensor and a received packet with a populated data range is received and processed by the SDL as described herein.

In another example, an SDL includes a sensor definition for an analog sensor. The configuration parameters of the analog sensor definition include parameters for Warmup Time, Physical Sensor Port Number, Sampling Rate, Voltage Reference (e.g., different options available for voltage reference), Upper Bound Voltage (e.g., 4-byte floating-point number representation), and a Total Number of Bytes to Receive. The commands of the analog sensor definition include only Read commands, due to the nature of analog sensors. The analog sensor definition data is provided to the SAL and used by the SAL to perform read commands in a defined manner and at a defined rate to obtain collected sensor data from the associated analog sensors.

Exemplary Operating Environment

Figure 7:
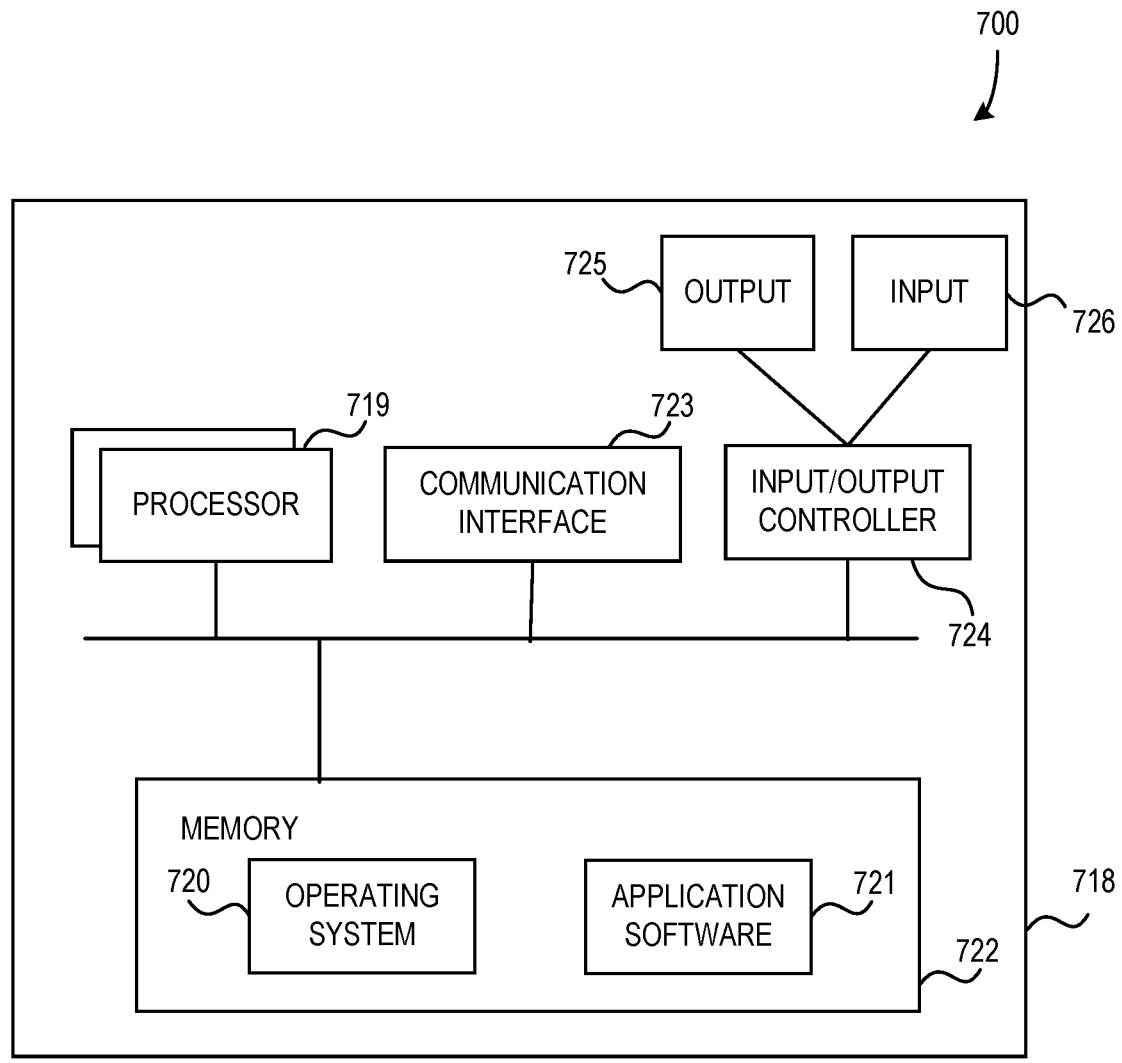
FIG. 7 illustrates a computing apparatus according to an embodiment as a functional block diagram.

The present disclosure is operable with a computing apparatus according to an embodiment as a functional block diagram 700 in FIG. 7. In an embodiment, components of a computing apparatus 718 may be implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. Platform software comprising an operating system 720 or any other suitable platform software may be provided on the apparatus 718 to enable application software 721 to be executed on the device. According to an embodiment, receiving and storing sensor definition data in an SDL of a sensor management device and providing the sensor definition data to end devices for use in configuring and operating connected sensors as described herein may be accomplished by software, hardware, and/or firmware.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g. using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone, or a touchpad. In one embodiment, the output device 725 may also act as the input device. An example of such a device may be a touch sensitive display. The input/output controller 724 may also output data to devices other than the output device, e.g. a locally connected printing device. In some embodiments, a user may provide input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: at least one processor of the sensor management device; and at least one memory comprising computer program code, the at least one memory and the computer program code configured to, with the at least one processor, cause the at least one processor to: establish a network connection between a sensor definition layer of the sensor management device and a sensor abstraction layer of the end device; identify sensor definition data of a sensor connected to the end device in a sensor definition data store of the sensor definition layer, wherein the sensor definition data is organized in a generic data structure that is independent of sensor type and wherein the sensor definition data includes sensor configuration data and a data conversion model associated with a sensor type of the sensor stored in the generic data structure; send the sensor configuration data of the sensor definition data to the sensor abstraction layer via the established network connection in a generic communication format based on the generic data structure, wherein the sensor abstraction layer is configured to configure the sensor and execute commands to collect sensor data from the sensor via a sensor interface based on the sensor configuration data in the generic communication format; receive raw sensor data from the sensor abstraction layer via the established network connection; convert the raw sensor data into converted sensor data based on the data conversion model of the sensor definition data; and provide the converted sensor data to an application, connected to the sensor management device, for consumption.

An example computerized method comprises: establishing, by a processor of the sensor management device, a network connection between a sensor definition layer of the sensor management device and a sensor abstraction layer of the end device; identifying, by the processor, sensor definition data of a sensor connected to the end device in a sensor definition data store of the sensor definition layer, wherein the sensor definition data is organized in a generic data structure that is independent of sensor type and wherein the sensor definition data includes sensor configuration data and a data conversion model associated with a sensor type of the sensor stored in the generic data structure; sending, by the processor, the sensor configuration data of the sensor definition data to the sensor abstraction layer via the established network connection in a generic communication format based on the generic data structure, wherein the sensor abstraction layer is configured to configure the sensor and execute commands to collect sensor data from the sensor via a sensor interface based on the sensor configuration data in the generic communication format; receiving, by the processor, raw sensor data from the sensor abstraction layer via the established network connection; converting, by the processor, the raw sensor data into converted sensor data based on the data conversion model of the sensor definition data; and providing, by the processor, the converted sensor data to an application, connected to the sensor management device, for consumption.

One or more computer storage media have computer-executable instructions that, upon execution by a processor, cause the processor to at least: establish a network connection between a sensor definition layer of the sensor management device and a sensor abstraction layer of the end device; identify sensor definition data of a sensor connected to the end device in a sensor definition data store of the sensor definition layer, wherein the sensor definition data is organized in a generic data structure that is independent of sensor type and wherein the sensor definition data includes sensor configuration data and a data conversion model associated with a sensor type of the sensor stored in the generic data structure; send the sensor configuration data of the sensor definition data to the sensor abstraction layer via the established network connection in a generic communication format based on the generic data structure, wherein the sensor abstraction layer is configured to configure the sensor and execute commands to collect sensor data from the sensor via a sensor interface based on the sensor configuration data in the generic communication format; receive raw sensor data from the sensor abstraction layer via the established network connection; convert the raw sensor data into converted sensor data based on the data conversion model of the sensor definition data; and provide the converted sensor data to an application, connected to the sensor management device, for consumption.

Alternatively, or in addition to the other examples described herein, examples include any combination of the following:

- wherein the sensor configuration data includes at least one of sensor address data, clock frequency data, warmup time data, sensor port data, or sensor command data.
- wherein sending the sensor configuration data to the sensor abstraction layer further includes: causing the sensor abstraction layer to configure a sensor via a sensor interface using at least one of the sensor address data, the clock frequency data, the warmup time data, and the sensor port data; and based on the sensor abstraction layer configuring the sensor, causing the sensor abstraction layer to collect raw sensor data from the sensor via the sensor interface using at least the sensor command data.
- further comprising: receiving the sensor definition data, by the processor, from the user interface connected to the sensor management device; and storing, by the processor, the received sensor definition data in the sensor definition data store of the sensor definition layer.
- wherein identifying the sensor definition data of the sensor connected to the end device further includes: identifying the end device based on the established network connection; determining a sensor type of the sensor connected to the end device based on a device sensor mapping of the sensor definition layer; and identifying the sensor definition data of the sensor based on the determined sensor type, wherein the sensor definition data is associated with the determined sensor type.
- wherein sending the sensor configuration data of the sensor definition data to the sensor abstraction layer via the established network connection in a generic communication format further includes sending a sensor configuration data packet to the sensor abstraction layer, wherein the sensor configuration data packet includes a sensor configuration data packet preamble, a sensor identifier, configuration parameters of the sensor configuration data, and sensor commands of the sensor configuration data.
- wherein converting the raw sensor data into converted sensor data based on the data conversion model of the sensor definition data further includes at least one of transforming raw sensor data values into converted sensor data values based on a data conversion formula of the data conversion model, aggregating a plurality of raw sensor data values into sensor data value trend information, or generating a visual data representation based on the raw sensor data.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for establishing, by a processor of the sensor management device, a network connection between a sensor definition layer of the sensor management device and a sensor abstraction layer of the end device; exemplary means for identifying, by the processor, sensor definition data of a sensor connected to the end device in a sensor definition data store of the sensor definition layer, wherein the sensor definition data includes sensor configuration data and a data conversion model associated with the sensor organized in a sensor type-independent format; exemplary means for sending, by the processor, the sensor configuration data of the sensor definition data to the sensor abstraction layer via the established network connection in a sensor type-independent communication format, wherein the sensor abstraction layer is configured to configure the sensor and execute commands to collect sensor data from the sensor via a sensor interface based on the sensor configuration data in the generic communication format; exemplary means for receiving, by the processor, raw sensor data from the sensor abstraction layer via the established network connection; exemplary means for converting, by the processor, the raw sensor data into converted sensor data based on the data conversion model of the sensor definition data; and exemplary means for providing, by the processor, the converted sensor data to an application, connected to the sensor management device, for consumption.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising: a processor of a sensor management device; and a memory comprising computer program code, the memory and the computer program code configured to, with the processor, cause the processor to: establish a network connection between a sensor definition layer of the sensor management device and a sensor abstraction layer that operates as virtual firmware for a plurality of end devices with respective connected sensors; identify sensor definition data of a sensor connected to an end device, of the plurality of end devices, in a sensor definition data store of the sensor definition layer of the sensor management device, wherein the identified sensor definition data is organized and stored in a generic data structure that is independent of sensor type, and wherein the sensor definition data includes i) sensor configuration data, ii) a plurality of commands, the plurality of commands comprising read commands, write commands, or one-time commands, and iii) a data conversion model associated with a sensor type associated with the end device; send the sensor configuration data and the plurality of commands of the sensor definition data to the sensor abstraction layer of the end device via the established network connection in a generic communication format based on the generic data structure, wherein the sensor abstraction layer is configured to configure the sensor and execute the plurality of commands to cause the sensor to collect raw sensor data from the sensor via a sensor interface based on the sensor configuration data sent in the generic communication format; receive the collected raw sensor data from the sensor abstraction layer via the established network connection; convert, via the sensor definition layer, the collected raw sensor data into converted sensor data based on the data conversion model of the sensor definition data; and provide the converted sensor data to an application, connected to the sensor management device, for consumption.

2. The system of claim 1, wherein the sensor configuration data further includes at least one of sensor address data, clock frequency data, warmup time data, sensor port data, or command configuration data; and wherein sending the sensor configuration data to the sensor abstraction layer further includes: causing the sensor abstraction layer to configure the sensor via the sensor interface using at least one of the sensor address data, the clock frequency data, the warmup time data, and the sensor port data.

3. The system of claim 1, wherein the memory and the computer program code are configured to, with the processor, further cause the processor to: display a user interface configured to enable the user to provide custom sensor definition data; receive the sensor definition data from the user interface connected to the sensor management device; and store the received sensor definition data in the sensor definition data store of the sensor definition layer.

4. The system of claim 1, wherein identifying the sensor definition data of the sensor connected to the end device further includes: identifying the end device based on the established network connection; determining the sensor type of the sensor connected to the end device based on a device sensor mapping of the sensor definition layer; and identifying the sensor definition data of the sensor based on the determined sensor type, wherein the sensor definition data is associated with the determined sensor type.

5. The system of claim 1, wherein sending the sensor configuration data of the sensor definition data to the sensor abstraction layer via the established network connection in the generic communication format further includes sending a sensor configuration data packet to the sensor abstraction layer, wherein the sensor configuration data packet includes a sensor configuration data packet preamble, a sensor identifier, configuration parameters of the sensor configuration data, and sensor commands of the sensor configuration data.

6. The system of claim 1, wherein converting the collected raw sensor data into the converted sensor data based on the data conversion model of the sensor definition data further includes at least one of transforming collected sensor data values into converted sensor data values based on a data conversion formula of the data conversion model, aggregating a plurality of collected sensor data values into sensor data value trend information, or generating a visual data representation based on the collected raw sensor data.

7. A computerized method comprising: establishing, by a processor of a sensor management device, a network connection between a sensor definition layer of a sensor management device and a sensor abstraction layer that operates as virtual firmware for a plurality of end devices with respective connected sensors; identifying, by the processor, sensor definition data of a sensor connected to an end device, of the plurality of end devices, in a sensor definition data store of the sensor definition layer of the sensor management device, wherein the identified sensor definition data is organized and stored in a generic data structure that is independent of sensor type and wherein the sensor definition data includes i) sensor configuration data, ii) a plurality of commands, the plurality of commands comprising read commands, write commands, or one-time commands, and iii) a data conversion model associated with a sensor type associated with the end device; sending, by the processor, the sensor configuration data and the plurality of commands of the sensor definition data to the sensor abstraction layer of the end device via the established network connection in a generic communication format based on the generic data structure, wherein the sensor abstraction layer is configured to configure the sensor and execute the plurality of commands to cause the sensor to collect raw sensor data from the sensor via a sensor interfacebased on the sensor configuration data sent in the generic communication format; receiving, by the processor, the collected raw sensor data from the sensor abstraction layer via the established network connection; converting, by the sensor definition layer, the collected raw sensor data into converted sensor data based on the data conversion model of the sensor definition data; and providing, by the processor, the converted sensor data to an application, connected to the sensor management device, for consumption.

8. The computerized method of claim 7, wherein the sensor configuration data includes at least one of sensor address data, clock frequency data, warmup time data, sensor port data, or command configuration data; and wherein sending the sensor configuration data to the sensor abstraction layer further includes: causing the sensor abstraction layer to configure the sensor via the sensor interface using at least one of the sensor address data, the clock frequency data, the warmup time data, and the sensor port data; and based on the sensor abstraction layer configuring the sensor, causing the sensor abstraction layer to collect the sensor data from the sensor via the sensor interface using at least the sensor command data.

9. The computerized method of claim 7, the computerized method further comprising: displaying, by the processor, a user interface configured to enable the user to provide custom sensor definition data; receiving the sensor definition data, by the processor, from the user interface connected to the sensor management device; and storing, by the processor, the received sensor definition data in the sensor definition data store of the sensor definition layer.

10. The computerized method of claim 7, wherein identifying the sensor definition data of the sensor connected to the end device further includes: identifying the end device based on the established network connection; determining the sensor type of the sensor connected to the end device based on a device sensor mapping of the sensor definition layer; and identifying the sensor definition data of the sensor based on the determined sensor type, wherein the sensor definition data is associated with the determined sensor type.

11. The computerized method of claim 7, wherein sending the sensor configuration data of the sensor definition data to the sensor abstraction layer via the established network connection in the generic communication format further includes sending a sensor configuration data packet to the sensor abstraction layer, wherein the sensor configuration data packet includes a sensor configuration data packet preamble, a sensor identifier, configuration parameters of the sensor configuration data, and sensor commands of the sensor configuration data.

12. The computerized method of claim 7, wherein converting the collected raw sensor data into the converted sensor data based on the data conversion model of the sensor definition data further includes at least one of transforming collected sensor data values into converted sensor data values based on a data conversion formula of the data conversion model, aggregating a plurality of collected sensor data values into sensor data value trend information, or generating a visual data representation based on the collected raw sensor data.

13. One or more computer storage media having computer-executable instructions that, upon execution by a processor, cause the processor to at least: establish a network connection between a sensor definition layer of a sensor management device and a sensor abstraction layer that operates as virtual firmware for a plurality of end devices with respective connected sensors; identify sensor definition data of a sensor connected to an end device, of the plurality of end devices, in a sensor definition data store of the sensor definition layer of the sensor management device, wherein the identified sensor definition data is organized and stored in a generic data structure that is independent of sensor type and wherein the sensor definition data includes i) sensor configuration data, ii) a plurality of commands, the plurality of commands comprising read commands, write commands, or one-time commands, and iii) a data conversion model associated with a sensor type associated with the end device; send the sensor configuration data and the plurality of commands of the sensor definition data to the sensor abstraction layer of the end device via the established network connection in a generic communication format based on the generic data structure, wherein the sensor abstraction layer is configured to configure the sensor and execute the plurality of commands to cause the sensor to collect raw sensor data from the sensor via a sensor interface based on the sensor configuration data sent in the generic communication format; receive the collected raw sensor data from the sensor abstraction layer via the established network connection; convert, via the sensor definition layer, the collected raw sensor data into converted sensor data based on the data conversion model of the sensor definition data; and provide the converted sensor data to an application, connected to the sensor management device, for consumption.

14. The one or more computer storage media of claim 13, wherein the sensor configuration data includes at least one of sensor address data, clock frequency data, warmup time data, sensor port data, or sensor command data.

15. The one or more computer storage media of claim 14, wherein sending the sensor configuration data to the sensor abstraction layer further includes: causing the sensor abstraction layer to configure the sensor via the sensor interface using at least one of the sensor address data, the clock frequency data, the warmup time data, and the sensor port data; and based on the sensor abstraction layer configuring the sensor, causing the sensor abstraction layer to collect the sensor data from the sensor via the sensor interface using at least the sensor command data.

16. The one or more computer storage media of claim 13, wherein the computer-executable instructions, upon execution by a processor, further cause the processor to at least: receiving the sensor definition data, by the processor, from a user interface connected to the sensor management device; and storing, by the processor, the received sensor definition data in the sensor definition data store of the sensor definition layer.

17. The one or more computer storage media of claim 13, wherein identifying the sensor definition data of the sensor connected to the end device further includes: identifying the end device based on the established network connection; determining the sensor type of the sensor connected to the end device based on a device sensor mapping of the sensor definition layer; and identifying the sensor definition data of the sensor based on the determined sensor type, wherein the sensor definition data is associated with the determined sensor type.

18. The one or more computer storage media of claim 13, wherein sending the sensor configuration data of the sensor definition data to the sensor abstraction layer via the established network connection in the generic communication format further includes sending a sensor configuration data packet to the sensor abstraction layer, wherein the sensor configuration data packet includes a sensor configuration data packet preamble, a sensor identifier, configuration parameters of the sensor configuration data, and sensor commands of the sensor configuration data.

* * * * *